United States Patent
Lee et al.

(10) Patent No.: US 7,399,955 B2
(45) Date of Patent: Jul. 15, 2008

(54) LOW PROFILE OPTICAL NAVIGATION SENSOR

(75) Inventors: Hun Kwang Lee, Sg. Rambal (MY); Sai Mun Lee, Sungal Nibong (MY); A/L Gopal Krishnan Thineshwaran, Jin Sultan Azian Shah (MY)

(73) Assignee: Avago Technologies General IP Pte Ltd, Singapore (SG)

( * ) Notice: Subject to any disclaimer, the term of this patent is extended or adjusted under 35 U.S.C. 154(b) by 183 days.

(21) Appl. No.: 11/406,085

(22) Filed: Apr. 18, 2006

(65) Prior Publication Data

US 2007/0241263 A1     Oct. 18, 2007

(51) Int. Cl.
*G06M 7/00* (2006.01)
*G06F 3/033* (2006.01)

(52) U.S. Cl. .................. 250/221; 345/163; 345/166

(58) Field of Classification Search .................. 250/221, 250/239, 222.1, 214.1, 559.29, 559.24; 345/157–167, 345/175, 207; 356/496, 399–401
See application file for complete search history.

(56) References Cited

U.S. PATENT DOCUMENTS 7,221,356 B2 *   5/2007   Oliver et al. ................. 345/166

* cited by examiner

*Primary Examiner*—Georgia Y. Epps
*Assistant Examiner*—Don Williams

(57) ABSTRACT

An apparatus having a coherent light source, an optical sensor, and a controller that can be utilized in optical mice and the like is disclosed. The coherent light source emits coherent light in a cone of angles about an illumination direction. The optical sensor includes an array of photodetectors disposed on a die having a surface substantially perpendicular to the illumination direction. The controller compares first and second images recorded by the optical sensor at different times and determines a displacement indicative of the direction and distance the apparatus has moved between the two different times. A portion of the coherent light source is bonded to the die at a location within the array of photodetectors.

7 Claims, 6 Drawing Sheets

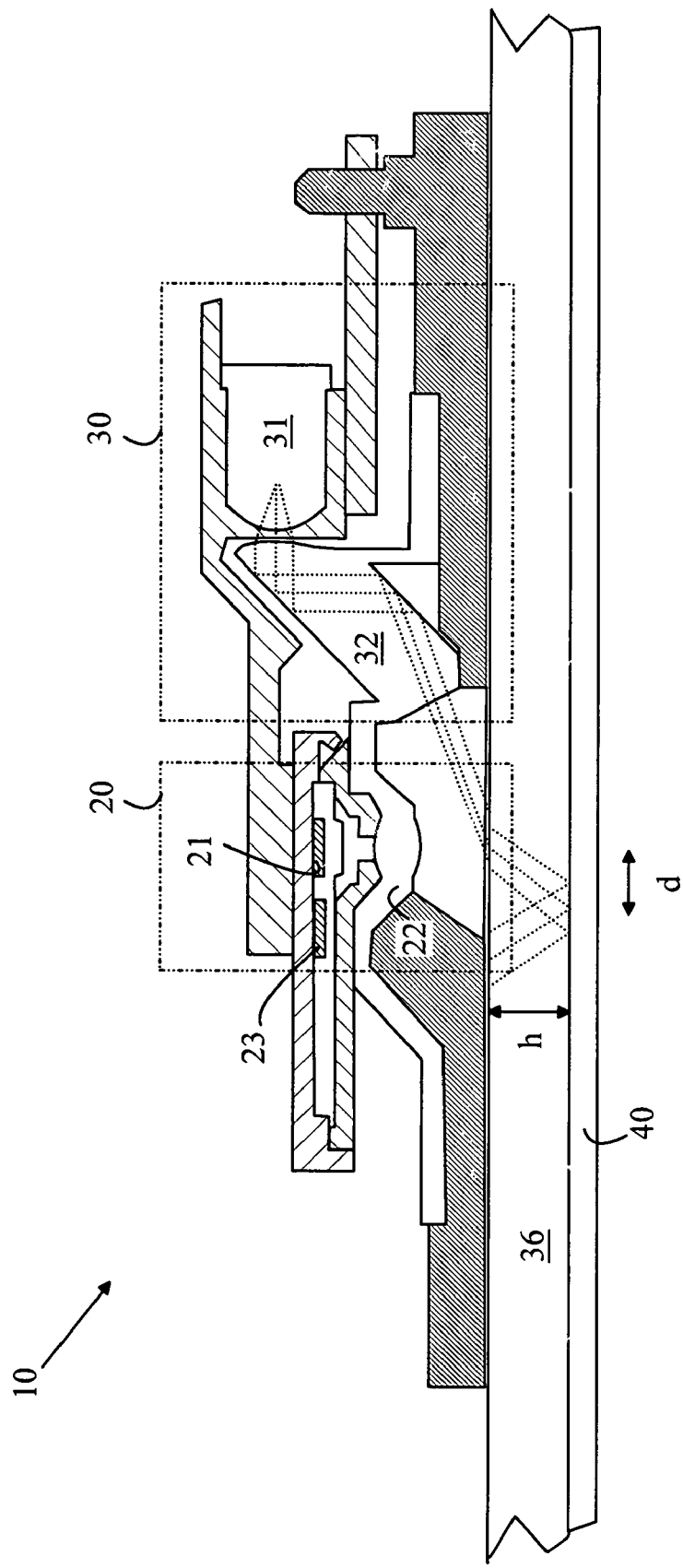

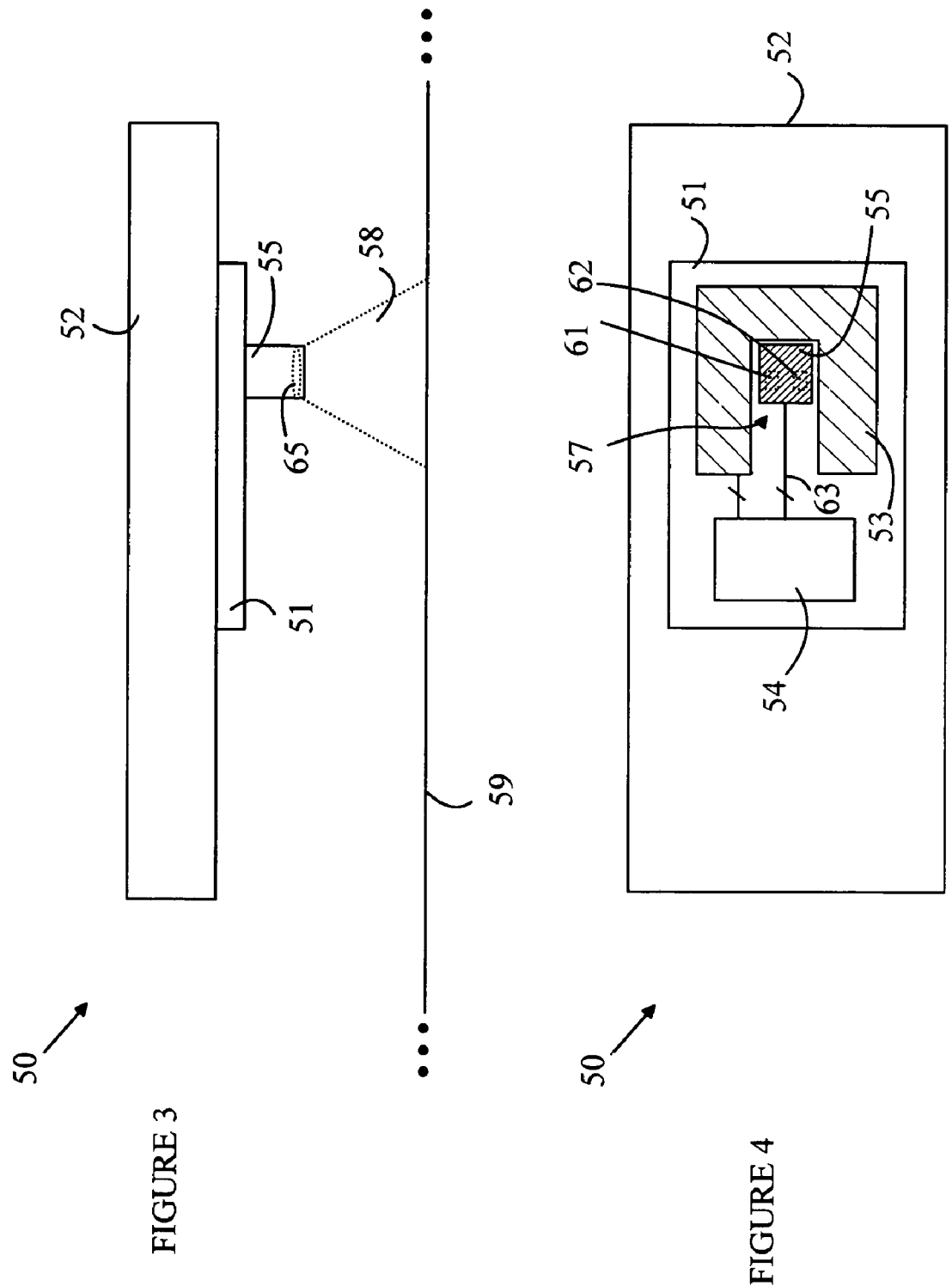

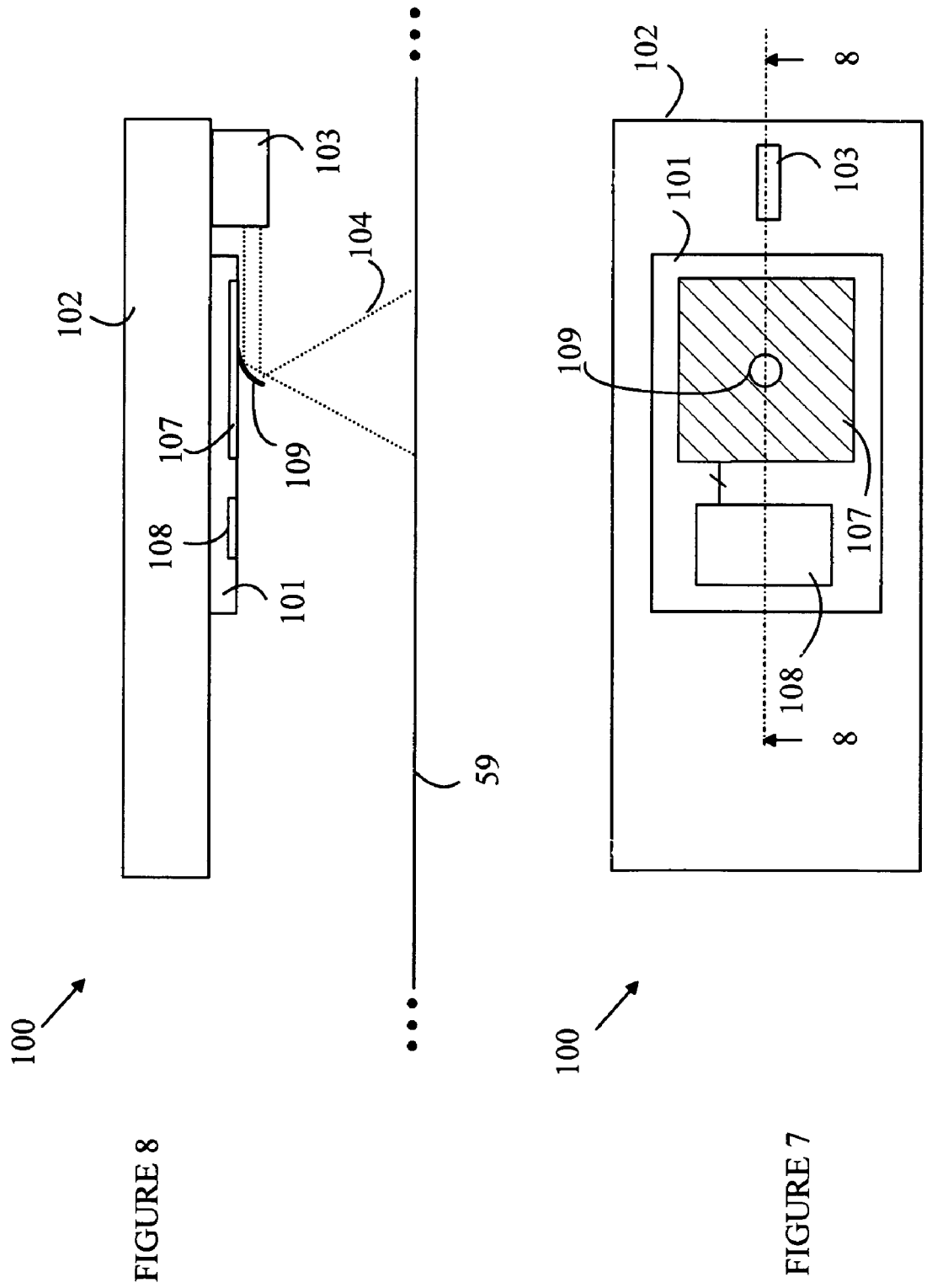

LOW PROFILE OPTICAL NAVIGATION SENSOR

BACKGROUND OF THE INVENTION

A common form of pointing device for use with computers and the like is referred to as a "mouse". The computer user moves the device over a surface to move a cursor on the computer screen. The amount and direction of motion of the mouse are sensed by the device and determine the distance and direction in which the cursor moves on the screen. Inexpensive mice based on a ball that rolls over the surface have been used for some time. The ball turns two cylinders that sense the distance and direction of motion. Unfortunately, the ball picks up grease and other dirt from the surface and transfers this material to the cylinders. The resulting coating on the cylinders interferes with the motion of the cylinders, and hence, the devices must be cleaned periodically. The cleaning operation is awkward and time consuming. In addition, the numerous mechanical assemblies included in the device increase the cost of assembly.

Mice based on optical sensing avoid this problem. Originally, such mice had to be moved over a special pad that had grid lines that were sensed by the device. The need to use this special pad made these devices less attractive than the mechanical mice discussed above. More recently, optical mice that do not require such pads have been developed. These mice include a light source that illuminates the surface under the mouse at a shallow angle, which accentuates the structural details of the surface. An image sensor in the mouse records an image of the illuminated surface periodically. By comparing two successive images, the displacement of the mouse between the times at which the images were taken can be determined.

This type of mouse requires a relatively complex packaging arrangement that includes an imaging lens and a relatively large "foot print". The shallow angle of illumination requires the light source, which is usually an LED, to be mounted some distance from the area that is illuminated. To accommodate this illumination distance, the size of the package must be increased. In addition, the package must include an imaging lens that images the surface onto the image sensor. The lens to image sensor distance and the lens to navigation surface distance set the minimum height of the package. In addition, the distance between the lens and the imaging sensor must be controlled, which increases the cost of fabrication.

In addition, this type of optical mouse does not function properly on a glass-covered surface such as the glass tops used on many desks or other work surfaces. The glass covers are used to protect the underlying surface. The top surface of the glass is too smooth to provide an image that has sufficient structure to measure the displacement of the mouse. While the surface under the mouse may have the required structure, the imaging sensor and optics in the mouse do not provide an in-focus image of the underlying surface. Hence, traditional optical mice have not been useable on many glass-covered desktops.

SUMMARY OF THE INVENTION

The present invention includes an apparatus having a coherent light source, an optical sensor, and a controller. The coherent light source emits coherent light in a cone of angles about an illumination direction. The optical sensor includes an array of photodetectors disposed on a die having a surface substantially perpendicular to the illumination direction. The controller compares first and second images recorded by the optical sensor at different times and determines a displacement indicative of the direction and distance the apparatus has moved between the two different times. A portion of the coherent light source is bonded to the die at a location within the array of photodetectors. The apparatus could include a structure having an enclosed cavity having the die located on a wall of the cavity and a transparent window in another wall of the cavity. The transparent window is positioned to transmit the light so as to illuminate a surface outside of the apparatus.

BRIEF DESCRIPTION OF THE DRAWINGS

FIG. 2 is a cross-sectional view of mouse 10 with a glass plate between the mouse and surface 40.

FIG. 3 is a cross-sectional view of navigation processor 50.

FIG. 4 is a bottom view of navigation processor 50.

FIG. 7 is a bottom view of navigation package 100.

FIG. 8 is a cross-sectional view of navigation package 100 through line 8-8 shown in FIG. 7.

DETAILED DESCRIPTION OF THE PREFERRED EMBODIMENTS OF THE INVENTION

Figure 1:
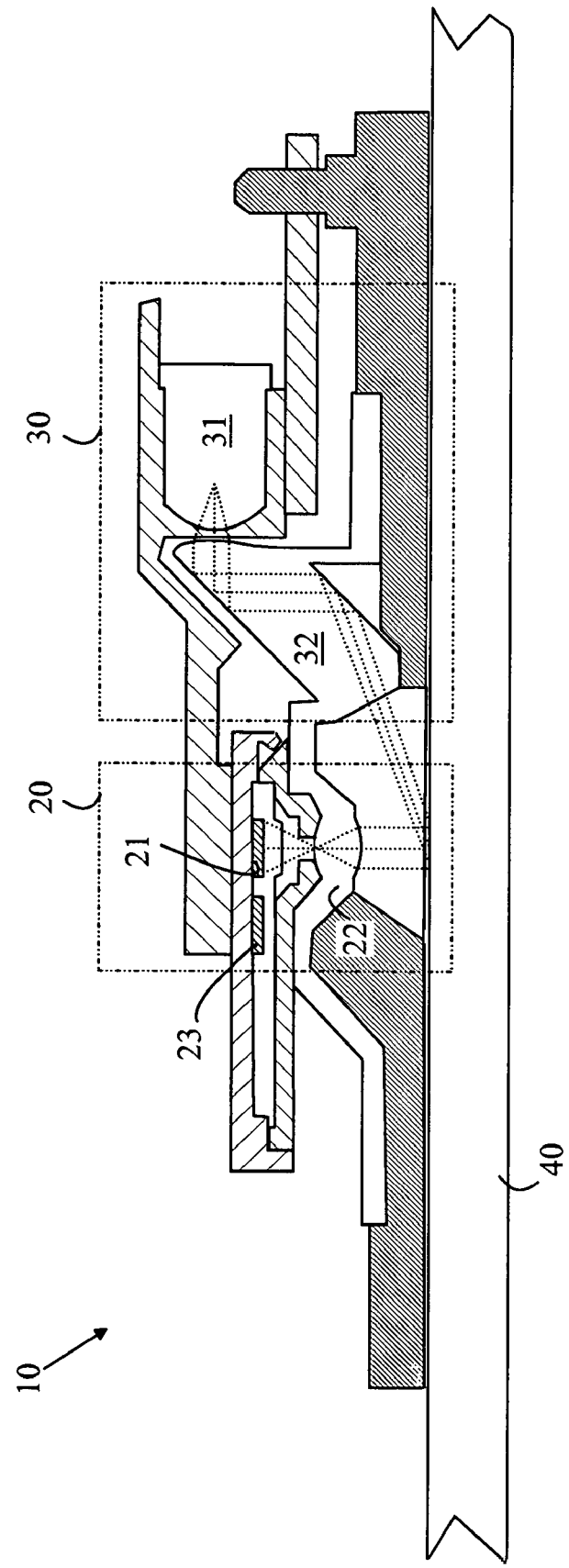
FIG. 1 is a simplified cross-sectional view of a prior art optical mouse 10 that moves over an opaque substrate.

The manner in which the present invention provides its advantages can be more easily understood with reference to FIGS. 1 and 2. FIG. 1 is a simplified cross-sectional view of a prior art optical mouse 10 that moves over an opaque substrate 40. Mouse 10 may be viewed as having two principal components, an illumination section 30 and an imaging section 20. Illumination section 30 typically includes a light source 31 and an optical assembly 32 that illuminates surface 40 with collimated light that strikes the surface at a shallow angle relative to the surface. The light source is typically an LED. Light from the illuminated portion of the surface is imaged by the imaging section onto a sensor 21 with the aid of a lens assembly 22. Sensor 21 is a two-dimensional array of imaging elements that forms an image of a portion of surface 40.

When the mouse is moved relative to the surface, the image shifts on sensor 21. If images are taken sufficiently close together in time, each successive image will contain a portion of the previous image. Hence, by comparing two successive images, mouse 10 can determine the offset between the images. For example, mouse 10 can compute the correlation of the first image shifted by various amounts with the second image. The shift that provides the highest correlation is assumed to be the displacement of the mouse during the period of time that elapsed between the times at which the two images were taken. In the embodiment shown in FIG. 1, it is assumed that a controller 23 performs the displacement computations and outputs a signal indicative of the motion. However, embodiments in which the image is output to a computer attached to the optical mouse can also be constructed.

As will be apparent from FIG. 1, illumination section 30 is relatively complex. Illumination section 30 includes two reflector surfaces and a collimating lens to provide the desired shallow angle of incidence in a relatively compact space. To reduce the size of the mouse, the light path is folded in a manner that increases the height of the package. However, even with this relatively complex light path, the horizontal dimension of the mouse is significantly increased by the illumination system relative to the dimension that would be required if the illumination system was not present.

The imaging section is basically a camera, and hence, requires a lens 22 as well as the image sensor. To minimize the cost and size of the lens, a significant distance must be maintained between the lens and the underlying surface. However, even with this distance, the lens system represents a significant portion of the cost of the mouse.

Refer now to FIG. 2, which is a cross-sectional view of mouse 10 with a glass plate 36 between mouse 10 and surface 40. As noted above, such glass plates are often used as protective coverings on writing desks. The top surface of glass plate 36 is too smooth to provide a reflected image having sufficient structure to allow the above-described correlation algorithm to operate successfully. Hence, the light from light source 31 is refracted into the glass and illuminates surface 40 under the glass plate. This light is then reflected back toward the mouse. Unfortunately, the illuminated area is shifted laterally by an amount d and vertically by an amount h relative to the area illuminated in the absence of the glass plate. Hence, the imaging optics 22 fail to image the illuminated area on sensor 21 either because the area of interest is outside the field of view of the imaging optics or because the area of interest is no longer in focus. Accordingly, the mouse will not operate satisfactorily on such a surface.

The present invention is based on the observation that a scattering surface will generate an interference pattern when illuminated with a coherent light source such as a laser. The interference pattern is created on any surface placed above the scattering surface. Navigation systems based on interference patterns are known to the art, and hence, will not be discussed in detail here. For the purposes of the present discussion it is sufficient to note that the pattern consists of bright and dark "spots" that move relative to the image sensor when the mouse moves over the navigation surface. The bright spots result from light rays that strike the surface after traveling distances that are integral multiples of the wavelength of the laser light, and hence, constructively interfere with one another. The dark spots result from rays whose paths differ by an integral multiple of wavelengths plus a half of a wavelength.

Prior art pointing devices based on coherent light illumination of the navigation surface also utilize surface illumination at a shallow angle with respect to the surface, and hence, impose the same type of size constraints as those discussed above. In contrast, the present invention utilizes an arrangement in which the coherent light illuminates the surface substantially at normal incidence, and hence, the lateral size constraints are avoided.

Refer now to FIGS. 3 and 4, which illustrate one embodiment of a navigation processor according to the present invention. FIG. 3 is a cross-sectional view of navigation processor 50, and FIG. 4 is a bottom view of navigation processor 50. Navigation processor 50 is normally mounted in a housing of a pointing device that maintains navigation processor 50 at a fixed distance above a surface 59. Navigation processor 50 includes an integrated circuit die 51 and a VCSEL 55 that is mounted on die 51. The die is, in turn, mounted on a printed circuit substrate 52. VCSEL 55 illuminates surface 59 with coherent light. The angles of incidence of the light on surface 59 are primarily within a cone of angles 58 about the normal to surface 59. The angle of divergence of the light in the cone must be sufficient to illuminate a sufficient area on surface 59 to provide successive images that can be compared to determine the amount of displacement of navigation processor 50 between successive frames. VCSELs that emit light in a cone of angles having a spread of 15 degrees are currently available. This cone angle is sufficient for the operation of a pointing device according to the present invention. In general, the present invention will operate satisfactory for cone angles between 0 and 45 degrees.

Referring to FIG. 4, die 51 includes an imaging array 53 and a controller 54. Imaging array 53 includes a two-dimensional array of photodiodes. Imaging arrays constructed in conventional CMOS processes are well known in the art, and hence, will not be discussed in detail here. For the purposes of the present discussion, it is sufficient to note that imaging array 53 includes a region 57 that includes pads 61 and 62 that are connected to two corresponding pads on VCSEL 55. Pads 61 and 62 are connected to controller 54 and are used to power VCSEL 55 via bus 63.

The present invention is based on the observation that when the surface is illuminated with coherent light, a pattern that moves with the position of the navigation processor is created on the imaging array. For example, a speckle pattern that arises from the coherent interference of the scattered light on the surface of the imaging array can be used for the navigation image. A speckle pattern is created on any surface placed above the scattering surface. Navigation systems based on speckle navigation are known to the art, and hence, will not be discussed in detail here. For the purposes of the present discussion it is sufficient to note that the pattern consists of bright and dark "spots". The bright spots result from light rays that strike the surface after traveling distances that are integral multiples of the wavelength of the laser light before arriving at the location in question on the imaging array, and hence, constructively interfere with one another. The dark spots result from rays whose paths differ by an integral multiple of wavelengths plus a half of a wavelength.

It should be noted that the speckle pattern does not require a lens between the imaging array and surface 59. Hence, the cost and complexity associated with providing the imaging optics discussed above are avoided. Furthermore, the navigation pattern is not a sensitive function of the distance between the imaging array and the navigation surface. Hence, navigation is possible even if the navigation surface is covered by a plate of glass or other transparent material. In fact, the interference pattern generated by the portion of the light reflected from the glass surface and the light reflected from the underlying scattering surface can also be utilized in determining the distance and direction of movement of the pointing device.

The size of the area on the navigation surface that is illuminated by VCSEL 55 is determined by the distance between the VCSEL and the navigation surface and on the angle of divergence of the light leaving the VCSEL. The area can be increased by increasing the VCSEL to navigation surface distance. In addition, the area can be increased by including a lens such as lens 65 in the VCSEL assembly to further increase the angle of divergence of the light. Variations in the distance from the end of the VCSEL to the lens result in variations in the size of the illuminated area, but do not substantially alter the performance of the pointing device. Similarly, variations in the VCSEL to navigation surface distance also result in variations in the size of the illuminated area rather than alterations in the detail in the patterns used for navigation. Hence, even in embodiments in which a lens is utilized, the precision required in the manufacture of the device is substantially less than that required in conventional pointing device designs.

Figure 5:
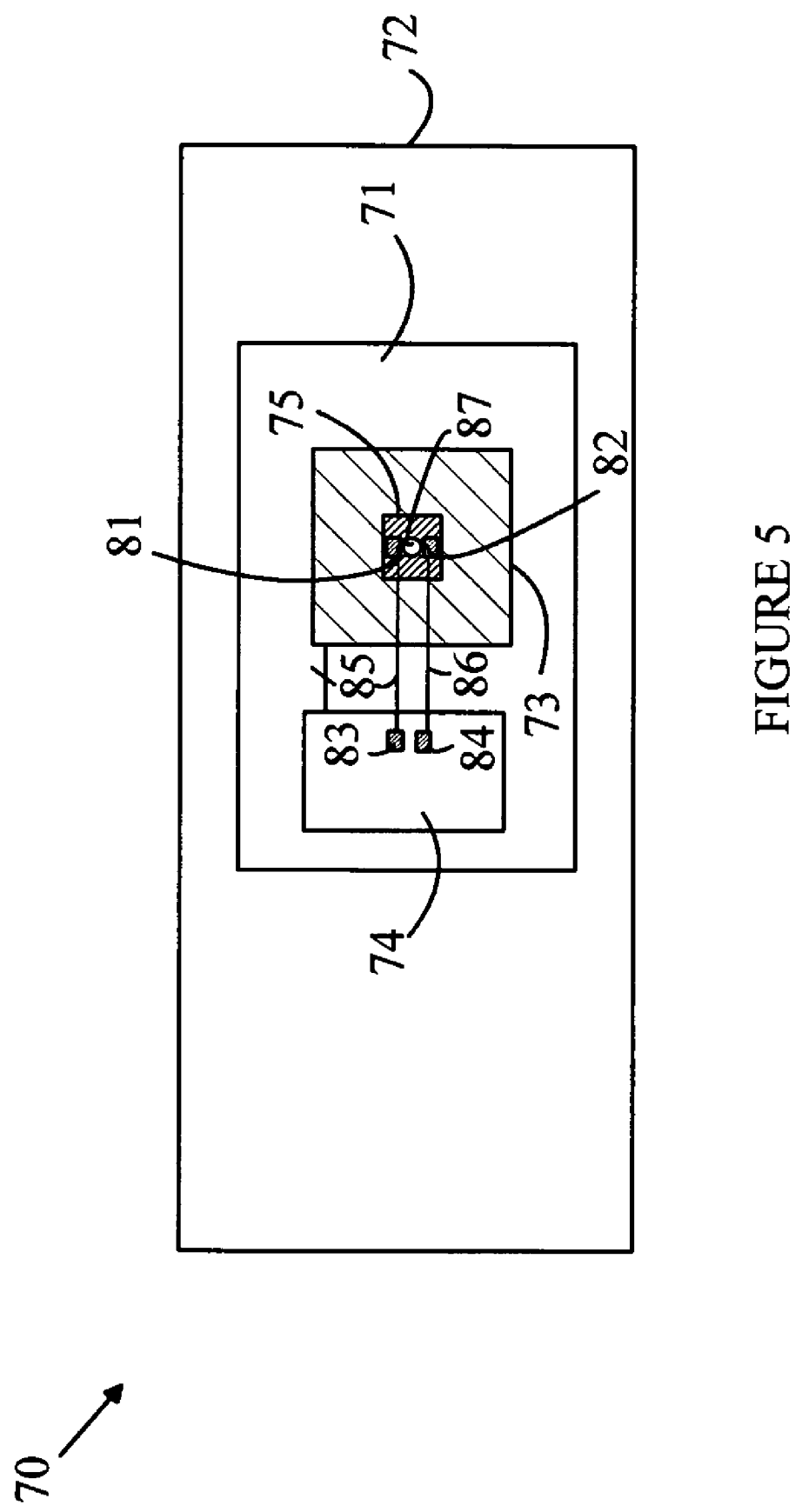
FIG. 5 is a bottom view of another embodiment of a navigation processor according to the present invention.

The above-described embodiments of the present invention utilize a sensor array in the shape of a horseshoe to provide a mounting pad that can be connected to the controller on the die via conductors constructed from the usual metalization layers on the die. However, other geometric arrangements can be utilized. Refer now to FIG. 5, which is a bottom view of another embodiment of a navigation processor according to the present invention. Navigation processor 70 includes a die 71 that is mounted on a structure 72 that can be incorporated in an optical mouse or similar pointing device. Navigation processor 70 includes an optical sensor 73 having a two-dimensional array of photodetectors for forming an image of the light pattern incident on the surface of optical sensor 73. Navigation processor 70 also includes a VCSEL 75 that emits coherent light through window 87. VCSEL 75 also includes two connection pads 81 and 82 that are accessible from the bottom of navigation processor 70. VCSEL 75 is powered by applying a signal across pads 81 and 82.

Navigation processor 70 also includes a controller 74, which is preferably fabricated on the same die as optical sensor 73. Controller 74 generates the signal that powers VCSEL 75 and controls the resetting and readout of optical sensor 73. Controller 74 can also perform the correlations between successive frames to determine the movement of navigation processor 70 between frames. Controller 74 includes two pads 83 and 84, which are connected to pads 81 and 82 by wire bonds 85 and 86.

Navigation processor 70 is constructed by affixing die 71 to structure 72 and then affixing VCSEL 75 to the surface of die 71 using an appropriate adhesive or bonding method. The connections between pads 83 and 84 and pads 81 and 82 are then made by conventional wire bonding techniques.

It should be noted that die 71 could be a conventional optical mouse optical sensor and controller. In this case, VCSEL 75 would cover a number of photo sensors in the array; however, the algorithm utilized by controller 74 can take into account the loss of these sensors. An embodiment that utilizes a conventional sensor die has the advantage of providing a single part for both types of pointing device, and hence, takes advantage of economies of scale that would not otherwise be available.

Figure 6:
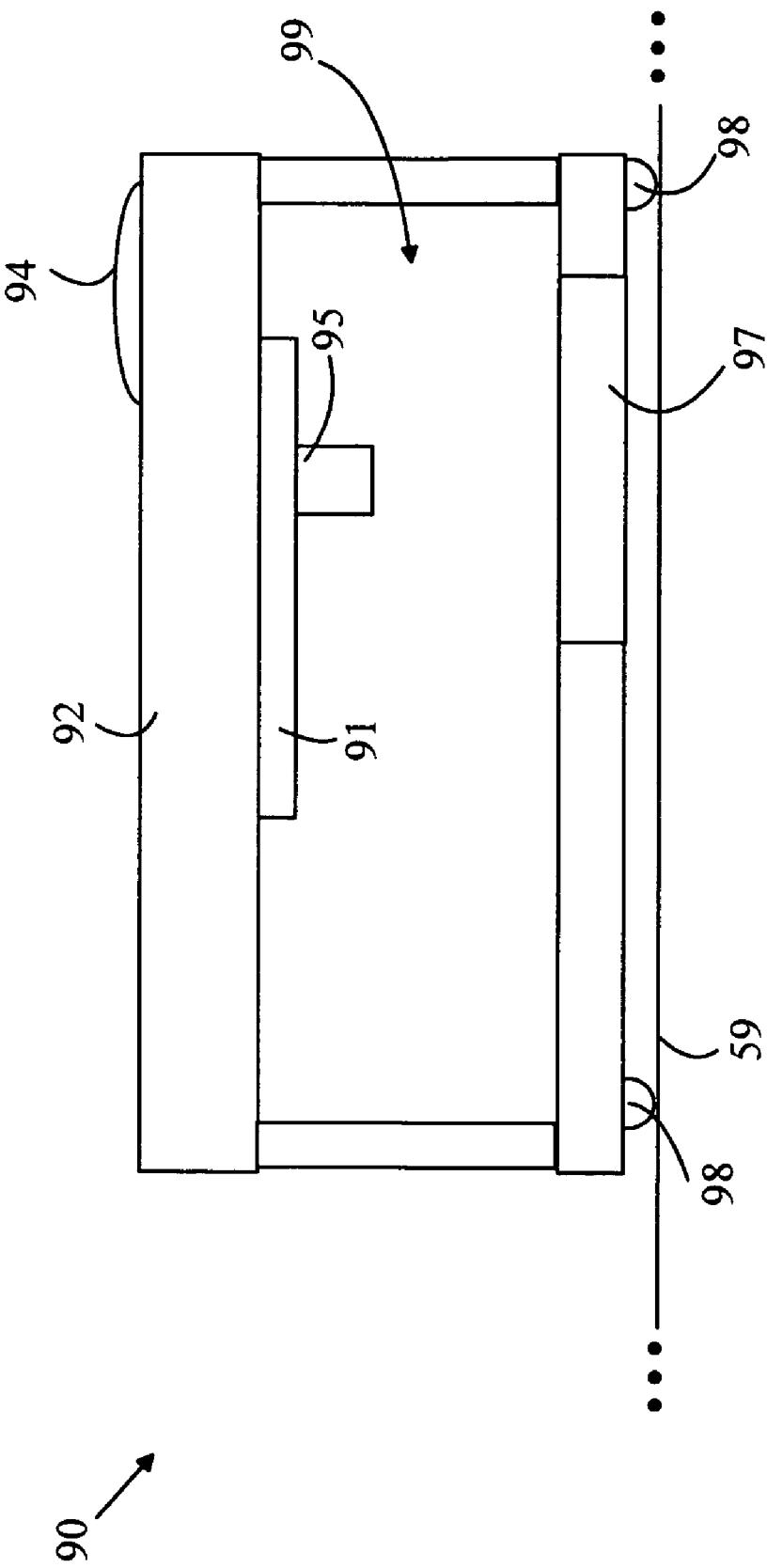
FIG. 6 is a simplified cross-sectional view of an optical mouse according to the present invention.

A navigation processor according to the present invention is particularly useful in constructing an optical pointing device such as an optical mouse. Refer now to FIG. 6, which is a simplified cross-sectional view of an optical mouse according to the present invention. Optical mouse 90 includes a structure 92 on which a die 91 is mounted. Die 91 is similar to dies 51 and 71 discussed above. A VCSEL 95 is bonded to die 91 and positioned such that light from VCSEL 95 illuminates surface 59 through window 97. Structure 92 forms one wall of a cavity 99 in which the navigation processor is located. Cavity 99 is preferably sealed to protect the optical sensor and VCSEL from debris that would otherwise accumulate on the surfaces thereof. Structure 92 could also include one or more buttons or scroll wheels such as button 94 that are actuated by the user of mouse 90 to signal various actions to the device connected to mouse 90. The signals from these buttons or scroll wheels could be processed by the controller on die 91 or sent directly to the device to which the mouse is connected. To simplify the drawing, the various connections between the components have been omitted. In addition, structure 92 can include spacers 98 that set the distance between the optical mouse and surface 59. The spacers also reduce the friction between optical mouse 90 and surface 59.

The above-described embodiments of the present invention utilize a VCSEL as the source of coherent light. However, any other coherent, or partially coherent, light source can be utilized in place of the VCSEL. For example, an edge-emitting semiconductor laser could be utilized by mounting the laser on its end or by providing a suitable mirror or other optical system for directing the light out of window 97. Refer now to FIGS. 7 and 8, which illustrate another embodiment of a navigation processor according to the present invention. FIG. 7 is a bottom view of navigation processor 100, and FIG. 8 is a cross-sectional view of navigation processor 100 through line 8-8 shown in FIG. 7. The light source in navigation processor 100 includes an edge-emitting laser diode 103 as the source of coherent light and a reflector 109. The light from laser diode 103 is assumed to be collimated into a small diameter beam that has too narrow a cone of angles to be suitable for illuminating surface 59 directly. A mirror 109 having a suitably curved surface is bonded to the center of imaging sensor 107. Mirror 109 causes the collimated light beam to diverge into a cone of angles shown at 104. Laser diode 103 is controlled by controller 108 that is preferably constructed on die 101 with image sensor 107. The connections between laser diode 103 and controller 108 have been omitted from the drawing. However, it is to be understood that laser diode 103 can be connected to controller 108 through conductors in structure 102 or via wire bonds in a manner analogous to that discussed above. In this regard, it should be noted that structure 102 can be a printed circuit board or similar circuit carrier having conductors formed therein.

The coherent light source in the above-described embodiments of the present invention is positioned near the center of the image sensor. This arrangement provides improved utilization of the coherent light relative to configurations in which the light source is mounted to the side of the image sensor. In addition, by providing a single part in which the light source is bonded to the die containing the image sensor, this arrangement reduces the amount of work that must be performed by the entity that constructs the optical mouse.

Various modifications to the present invention will become apparent to those skilled in the art from the foregoing description and accompanying drawings. Accordingly, the present invention is to be limited solely by the scope of the following claims.

What is claimed is:

1. An apparatus comprising:
   a coherent light source that emits coherent light in a cone of angles about an illumination direction;
   an optical sensor comprising an array of photodetectors disposed on a die having a surface substantially perpendicular to said illumination direction; and
   a controller that compares first and second images recorded by said optical sensor at different times and for determining a displacement indicative of the direction and distance said apparatus has moved between said two different times,
   wherein a portion of said coherent light source is bonded to said die at a location within said array of photodetectors.

2. The apparatus of claim 1 wherein said coherent light source comprises a semiconductor laser.

3. The apparatus of claim 1 wherein said die comprises said controller.

4. The apparatus of claim 1 wherein said cone of angles has an opening angle between 0 and 45 degrees.

5. The apparatus of claim 1 wherein said coherent light source comprises an optical element that determines said cone of angles.

6. The apparatus of claim 1 further comprising a structure having an enclosed cavity, said die being located on a wall of said cavity.

7. The apparatus of claim 6 wherein said cavity comprises a transparent window in another wall of said cavity, said transparent window being positioned to transmit said coherent light so as to illuminate a surface outside of said apparatus and receive light reflected from that surface.

* * * * *